(12) United States Patent
Qi et al.

(10) Patent No.: US 7,220,693 B1
(45) Date of Patent: *May 22, 2007

(54) FUEL CELL CATALYST ELECTRODES

(75) Inventors: Zhigang Qi, North Arlington, NJ (US); Zhiqiang Xu, Bloomfield, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 227 days.

This patent is subject to a terminal disclaimer.

(21) Appl. No.: 10/187,033

(22) Filed: Jun. 27, 2002

(51) Int. Cl.
*H01M 4/88* (2006.01)
(52) U.S. Cl. .................... 502/101; 429/40
(58) Field of Classification Search ........... 429/40–44, 429/29, 33, 46; 502/101, 180, 185, 527.14, 502/527.15, 221, 222; 423/449.2, 449.3, 423/36, 37, 460, 545; 29/623.1–623.5; 521/33
See application file for complete search history.

(56) References Cited

U.S. PATENT DOCUMENTS

| | | |
|---|---|---|
| 4,166,143 A | 8/1979 | Petrow et al. |
| 4,876,115 A | 10/1989 | Raistrick |
| RE33,149 E | 1/1990 | Petrow et al. |
| 4,921,826 A * | 5/1990 | Juntgen et al. ............ 502/180 |
| 5,211,984 A | 5/1993 | Wilson |
| 5,723,173 A | 3/1998 | Fukuoka et al. |
| 5,728,485 A | 3/1998 | Watanabe et al. |
| 6,194,344 B1 * | 2/2001 | Tsuchitani et al. .......... 502/174 |
| 6,309,772 B1 | 10/2001 | Zuber et al. |
| 2003/0022055 A1 * | 1/2003 | Menashi ..................... 429/44 |
| 2004/0110051 A1 * | 6/2004 | Srinivas ...................... 429/33 |

OTHER PUBLICATIONS

Kim et al., "Study on the Pt/C catalyst for PAFC's electrode", Kongop Hwahak (1993) 522-9.*
Easton et al., "Chemical Modification of Proton Exchange Membrane Fuel Cell Catalysts with a Sulfonated Silane", Electrochemical and Solid State Letters, 4 (5) A59-A61, available Mar. 21, 2001.*
DOD Fuel Cells: http://www.dodfuelcell.com/phosphoric.html.*
E.A. Ticianelli et al, J. Electrochem. Soc., Methods to Advance Technology of Proton Exchange Membrane Fuel Cells, pp. 2209-2214, Sep. 1998.
Poltarzewski et al, J. Electrochem Soc., Nafion Distribution in Gas Diffusion Electrodes for Solid-Polymer-Electrolyte-Fuel-Cell Applications, pp. 761-765, Mar. 1992.
Qi et al, Chem. Commun., Novel Supported Catalysts: Platinum and Platinum Oxide Nanoparticles Dispersed on Polypyrrole/Polystyrenesulfonate Particles, pp. 15-16, 1998.
Qi et al, Chem. Commun., High Performance Conducting Polymer Supported Oxygen Reduction Catalysts, pp. 2299-2230, 1998.

(Continued)

*Primary Examiner*—Susy Tsang-Foster
*Assistant Examiner*—Keith Walker
(74) *Attorney, Agent, or Firm*—Mark Levy & Associates, PLLC; David L. Banner (57) ABSTRACT

Acidic groups such as those in the sulfonic acid family have been successfully linked onto the surface of carbon used as catalyst support. Electrodes made using such sulfonated catalysts as used in electrochemical cells improve the performance of the cells, more so than cells fabricated from electrodes using an unsulfonated electrode.

8 Claims, 5 Drawing Sheets

OTHER PUBLICATIONS

Qi et al, J. Electroanal. Chem., Electron and Proton Transport in Gas Diffusion Electrodes Containing Electronically Conductive Proton-Exchange Polymers, pp. 9-14, 1998.

Lefebvre et al, J. Electrochem. Soc., Electronically Conducting Proton Exchange Polymers as Catalyst Supports for Proton Exchange Membrane Fuel Cells, p. 146, Jun. 1999.

Jia et al, Electrochimica Acta, Modification of Carbon Supported Catalysts to Improve Performance in Gas Diffusion Electrodes, pp. 2863-2869, 2001.

Easton et al, Electrochem. Solid-State Letters, Chemical Modification of Proton Exchange Membrane Fuel Cell Catalysts with a Sulfonated Silane, pp. A59-A61, May 2001.

* cited by examiner

FUEL CELL CATALYST ELECTRODES

FIELD OF THE INVENTION

This invention relates to electrochemical cells that comprise a stack of elements that include carbon-supported catalyst layers for catalyzing the cell reactions and, more particularly, to a sulfonated catalyst layer for proton-exchange membrane (PEM) fuel cells, direct methanol fuel cells (DMFCs), and electrolyzers.

BACKGROUND OF THE INVENTION

The performance of a proton-exchange membrane (PEM) fuel cell and a direct methanol fuel cell (DMFC) is largely determined by the membrane-electrode assembly (MEA). The MEA is generally composed of an anode that oxidizes the fuel, a cathode that reduces oxygen, and an ionically-conducting membrane for proton conductance. The membrane also prevents electrical short-circuiting between the anode and the cathode, and it physically separates the fuel from the oxidant.

A PEM fuel cell normally uses hydrogen as the fuel, while a DMFC uses methanol. As used herein, the term "fuel cell" represents both types of fuel cells.

The fuel oxidation reaction and the oxygen reduction reaction are kinetically slow, and therefore, catalysts such as platinum and its alloys are used to catalyze the fuel cell reactions. The catalysts are made into porous layers to increase the contact area between the reactants and the catalyst particles. The catalyst materials can be applied to the membranes, or upon gas diffusion media. Carbon paper and carbon cloth-type materials are the prevalent gas diffusion media owing to their good electrical conductivity, high corrosion resistance, and controllable porosity.

One approach toward producing low cost fuel cells is reducing the amount of noble metal materials used in the catalyst layers. Metal black with lower surface area was initially tried. The catalyst loading in an electrode needs to be over 4.0 mg/cm$^2$ in order to achieve good performance. Later attempts utilized smaller metal nano-particles with a higher surface area. The nano-particles were deposited upon a support, as illustrated in U.S. Pat. No. 4,166,143, issued to Petrow et al on Aug. 28, 1979 for CONTROL OF THE INTERACTION OF NOVEL PLATINUM-ON-CARBON ELECTROCATALYSTS WITH FLUORINATED HYDROCARBON RESINS IN THE PREPARATION OF FUEL CELL ELECTRODES; U.S. Pat. No. 4,876,115, issued to Ian D. Raistrick on Oct. 24, 1989 for ELECTRODE ASSEMBLY FOR USE IN A SOLID POLYMER ELECTROLYTE FUEL CELL; and Re. 33,149, issued to Petrow et al on Jan. 16, 1990 for FINELY PARTICULATED COLLOIDAL PLATINUM COMPOUND AND SOL FOR PRODUCING THE SAME AND METHOD OF PREPARATION OF FUEL CELL ELECTRODES AND THE LIKE EMPLOYING THE SAME.

The catalyst support has several functions. It provides sites for anchoring the metal particles during and after their formation. The particles formed in such an environment have small and uniform size. In addition, due to the chemical/physical interaction between the support and these metal particles, the latter tend not to coalesce or aggregate, thus becoming less likely to lose surface area as fast as an unsupported catalyst. In addition, the support provides electrical connection for metal particles supported on different support particles. Carbon black is the most practical support used in fuel cells because of its large surface area, good electrical and thermal conductivities, and high corrosion resistance.

Electrical as well as proton conductivities are needed, since both electrons and protons are involved in fuel cell reactions. Thus, the reaction zone is traditionally limited within the interface between the catalyst layer and the ionically-conducting membrane. Since this interfacial region is extremely thin, the total surface area of the catalyst particles in this region is low; thus, such a catalyst layer cannot provide a high current density. The catalyst that is not in contact with the membrane is simply wasted.

More recently, an ionic conductor such as Nafion®, a perfluorinated ionomer, made by E. I. DuPont, has been incorporated into the catalyst layers. After Nafion incorporation, the entire catalyst layer conducts both electrons and protons, dramatically improving the performance of the catalyst layer. The catalyst layer is thus able to generate and sustain higher current densities.

Nafion can be impregnated into a catalyst layer by brushing and spraying, or by floating the electrode upon, or dipping it in, a Nafion solution, as illustrated by Ticianelli et al, J. Electrochem. Soc. pp. 2209–2214 (1988), September; and by Poltarzewski et al, J. Electrochem. Soc. pp. 761–765 (1992), March. The advantage of this procedure is that a water-repelling agent like polytetrafluoroethylene (PTFE) can be incorporated into the catalyst layer before the application of Nafion, so the final catalyst layer has a controllable hydrophobicity. This reduces the likelihood of flooding in the fuel cell. The disadvantage of this method, however, is that it is very difficult to control the amount of the applied Nafion. It is impossible to have a homogeneous distribution of Nafion in the entire catalyst layer. The regions with more Nafion may become flooded, while the regions with insufficient Nafion may not be able to provide enough proton conductivity. Nafion may localize on the surface in one place, but penetrate the underlying gas diffusion medium in another place.

Another method to incorporate Nafion into the catalyst layer is to mix catalysts (especially supported catalysts) with Nafion directly. The resulting mixture is then used to make the catalyst layer, as illustrated in U.S. Pat. No. 5,211,984, issued to Mahlon S. Wilson on May 18, 1993 for MEMBRANE CATALYST LAYER FOR FUEL CELLS; U.S. Pat. No. 5,723,173, issued to Fukuoka et al on Mar. 3, 1998, for METHOD FOR MANUFACTURING SOLID POLYMER ELECTROLYTE FUEL CELL; U.S. Pat. No. 5,728,485, issued to Watanabe et al on Mar. 17, 1998 for ELECTRODE FOR POLYMER ELECTROLYTE ELECTROCHEMICAL CELL AND PROCESS OF PREPARING SAME; and U.S. Pat. No. 6,309,772 B1, issued to Zuber et al on Oct. 30, 2001 for MEMBRANE-ELECTRODE UNIT FOR POLYMER ELECTROLYTE FUEL CELLS AND PROCESSES FOR THEIR PREPARATION.

The catalyst and Nafion can form a pretty good mixture using these patented methods. Nafion and the catalyst materials achieve a more even distribution through the entire catalyst layer. Solvents such as glycerol may be used during the mixing in order to achieve a good viscosity, and additionally, to hold the catalyst particles in suspension. This minimizes their agglomeration, as shown in aforementioned U.S. Pat. No. 5,211,984. Sometimes, a Nafion solution is converted into a colloid by adding a proper organic solvent, before mixing it with the catalyst, as illustrated in aforementioned U.S. Pat. No. 5,723,173, in which the colloidal Nafion is claimed to form a good network and achieve a uniformity upon distribution of the catalyst particles.

Directly mixing a Nafion solution or colloid with the catalyst makes it difficult to incorporate PTFE into the catalyst layer. This is so because the subsequent sintering of the PTFE at a temperature higher than 330° C. destroys Nafion. Without PTFE, the catalyst layer is more likely to be flooded, and therefore must be thin.

Although the incorporation of Nafion has dramatically increased the efficacy of catalyst in the catalyst layer, a large portion of the catalyst particles still do not participate in the reactions. Nafion molecules are fairly large, with a molecular weight on the order of 250,000 to 1,000,000 g/mole. They only can penetrate into the gaps among the agglomerates of the carbon support, and each one of the agglomerates possibly contains hundreds of primary carbon particles. It is obvious that most of the primary carbon particles will not be in contact with Nafion particles, so they cannot participate in the reactions.

Catalyst particles formed within the pores of the carbon support have little chance to participate in the reaction, even though the carbon particles themselves are in direct contact with the Nafion particles, because Nafion particles cannot get into the pores at all. Of course, for the carbon particle agglomerates that are not mixed with Nafion particles, none of the supported catalyst particles will be able to contribute.

It will be difficult for the reactants to enter, or for the products to leave, those catalyst particles that are buried under Nafion. Thus, their activities will be reduced. In addition, the incorporation of Nafion into a catalyst layer will reduce the gas permeability and electronic conductivity of the catalyst layer, which will in turn reduce the fuel cell performance. This is especially so when the cell is operated at high current densities.

It has been envisioned that the catalyst utilization will be further increased if a proton conductor is directly linked onto the surface of the carbon support. Some initial work has been done toward achieving this goal. Prepared polymer composites like polypyrrole/polystyrenesulfonic acid and poly(3,4-ethylenedioxythiophene)/polystyrenesulfonic acid have been used as catalyst supports. These composite particles conduct both electrons (by the conducting polymer such as polypyrrole, and poly(3,4-ethylenedioxythiophene)) and protons (by the ionomer, polystyrenesulfonic acid). Thus, good oxygen reduction has been achieved, as illustrated by Qi et al, Chem. Commun., pp. 15–16, 1998; Chem. Commun., pp. 2299–2230, 1998; and J. Electroanal. Chem., pp. 9–14, 1998; and by Lefebvre et al, J. Electrochem. Soc., 146, pp. 2054–2058, June 1999. A major problem with using a conducting polymer as the support is the loss of electronic conductivity under fuel cell operating conditions.

Jia et al teach that increasing the wettability and proton conductivity of the surface of carbon particles by oxidizing the carbon with nitric acid and other oxidants, produces enhanced electrode performance (Electrochimica Acta, pp. 2863–2869, 2001). However, since carboxylic acid is a weak acid and a poor proton conductor, the increased performance is very limited. Easton et al recently attached sulfonated silane onto the surface of carbon support and achieved the optimal fuel cell performance with only 10% of Nafion (dry mass) mixed into the catalyst layer. It was demonstrated that 30% of Nafion was needed to achieve the best performance for the unsulfonated counterpart, as illustrated in Easton et al, Electrochem. Solid-State Letters, pp. A59–A61, May 2001. However, the best performance of the sulfonated silane-treated catalyst was not as good as that of the untreated counterpart. This inferior performance could be due to the reduction of electronic conductivity of the carbon support and the blockage of some catalyst particles by the attached silane. In addition, the silanization process is not easy to control.

One object of the present invention is to provide an effective and simple procedure to link sulfonic acid onto the surface of carbon supporting a catalyst using sulfonation agents.

Another object of this invention is to increase the proton conductivity at the surface of carbon particles supporting the catalyst.

Still another object of this invention is to increase catalyst utilization within a catalyst layer so a higher performance can be achieved with a reduced amount of catalyst loading.

Still another object of this invention is to reduce the amount of Nafion needed in a catalyst layer.

SUMMARY OF THE INVENTION

Use of a proton conductor like Nafion does not fully utilize the catalyst even though it conducts protons. Many of the catalyst sites are not available for reactions. This situation can be improved by linking sulfonic acid to the surface of carbon particles, which function as a support for catalyst particles. This sulfonation can be achieved in several ways. First, carbon particles supporting catalyst materials are sulfonated. Then, the sulfonated catalyst is mixed with Nafion and other components to produce a catalyst layer. Second, bare carbon particles are first sulfonated. A catalyst is then deposited on these sulfonated carbon particles. Third, a sulfonation agent is mixed with catalyst materials and other components, and the mixture is made into an electrode. A sulfonation step is then additionally performed on the electrode. Fourth, regular carbon particles that have been incorporated into a catalyst layer can be sulfonated by applying a sulfonation agent to the electrode. A variety of chemicals can be used as the sulfonation agents, such as $(NH_4)_2SO_4$, $NH_4HSO_4$, $(NH_4)_2SO_3$, $(NH_4)_2S_2O_8$, $(NH_4)_2S_2O_3$, and $NH_4SO_3CF_3$.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Generally speaking, the invention features catalyst materials that have been sulfonated and used to fabricate fuel cell catalysts, elements, and stack layers. The catalyst materials included Pt supported on carbon, such as 20% Pt/Vulcan XC-72. Ammonium sulfate, $(NH_4)_2SO_4$, was used as an example sulfonation agent. The sulfonation of the catalyst was accomplished in two steps. First, $(NH_4)_2SO_4$ solution was mixed with a proper amount of catalyst based on a predetermined weight percentage of $(NH_4)_2SO_4$. The weight percentage was defined as the ratio of the weight of $(NH_4)_2SO_4$ to the total weight of $(NH_4)_2SO_4$ and the catalyst. For example, for a target of 10% $(NH_4)_2SO_4$, 0.5 g of $(NH_4)_2SO_4$ dissolved in approximately 5 ml of water was mixed with 4.5 g of the catalyst. Second, after the mixture was well agitated, it was heated at 235° C. for up to 30 minutes. At 235° C., $(NH_4)_2SO_4$ decomposes and a functional group like —$SO_3H$ links onto the surface of carbon. This acidic group will largely increase the proton conductivity at the surface of carbon. Meanwhile, the distribution of catalyst particles on carbon is not expected to be adversely affected by those functional groups. The resulting catalyst is called sulfonated or treated catalyst, while the initial Pt catalyst is called untreated or unsulfonated catalyst. The sulfonation can also be performed on the carbon black first; then a catalyst such as Pt is deposited onto the sulfonated carbon.

A catalyst mixture was obtained by mixing the catalyst (either treated or untreated) with Nafion solution at a predetermined Nafion content. Nafion content is defined as the weight ratio of Nafion (dry weight) to the total weight of both Nafion and the catalyst. After a thorough mixing, the mixture was applied onto a gas diffusion medium, such as Toray paper that had been treated with a mixture of carbon black and polytetrafluoroethylene.

Sulfonation can also be achieved after an electrode has been made using untreated catalysts. The sulfonation steps include: 1) applying such as spraying $(NH_4)_2SO_4$ solution onto the electrode, and 2) drying the electrode at 235° C. for up to 30 minutes.

A membrane-electrode assembly (MEA) was fabricated by hot-pressing two pieces of electrodes with an active area of 10 cm$^2$, onto a Nafion 112 membrane at 130° C. The resulting MEA was then tested in a single cell test fixture. The test fixture was composed of a pair of metal plates with serpentine flow-fields. The plates were coated with a metal nitride for corrosion protection. Rod-like heaters were inserted into the plates to control the cell temperature. Air and pure hydrogen were used as the reactants, and their stoichiometries were controlled at approximately 10 at a current density of 2.0 A/cm$^2$. The gaseous reactants were humidified by passing them through water contained in stainless steel bottles. Cell temperatures of 35° C., hydrogen humidification temperature of 45° C., and air humidification temperature of 45° C. are denoted hereinafter as 35/45/45° C.

Figure 1:
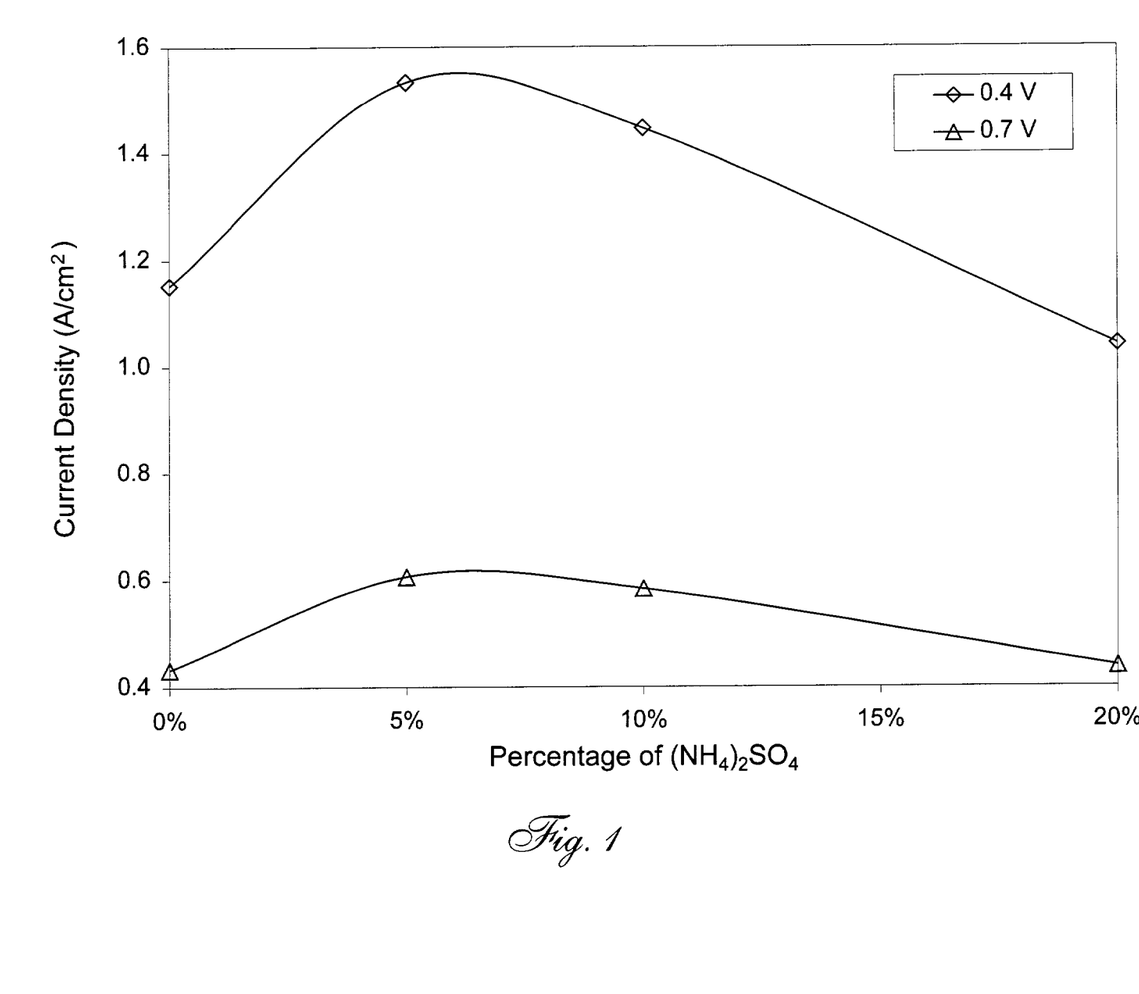
FIG. 1 shows a graph depicting the effect of $(NH_4)_2SO_4$ percentage on fuel cell performance.

Now referring to FIG. 1, the effect on performance of a fuel cell in relation to the percentage of $(NH_4)_2SO_4$ used to treat the catalyst of the fuel cell, is illustrated. The current densities at a cell voltage of 0.40 and 0.70 V are plotted, respectively. All the catalyst layers contained 17.5% Nafion, and their Pt loadings were controlled at approximately 0.30 mg/cm$^2$. It can be concluded that catalysts treated with a 5 to 10% of $(NH_4)_2SO_4$ give better performance.

Figure 2:
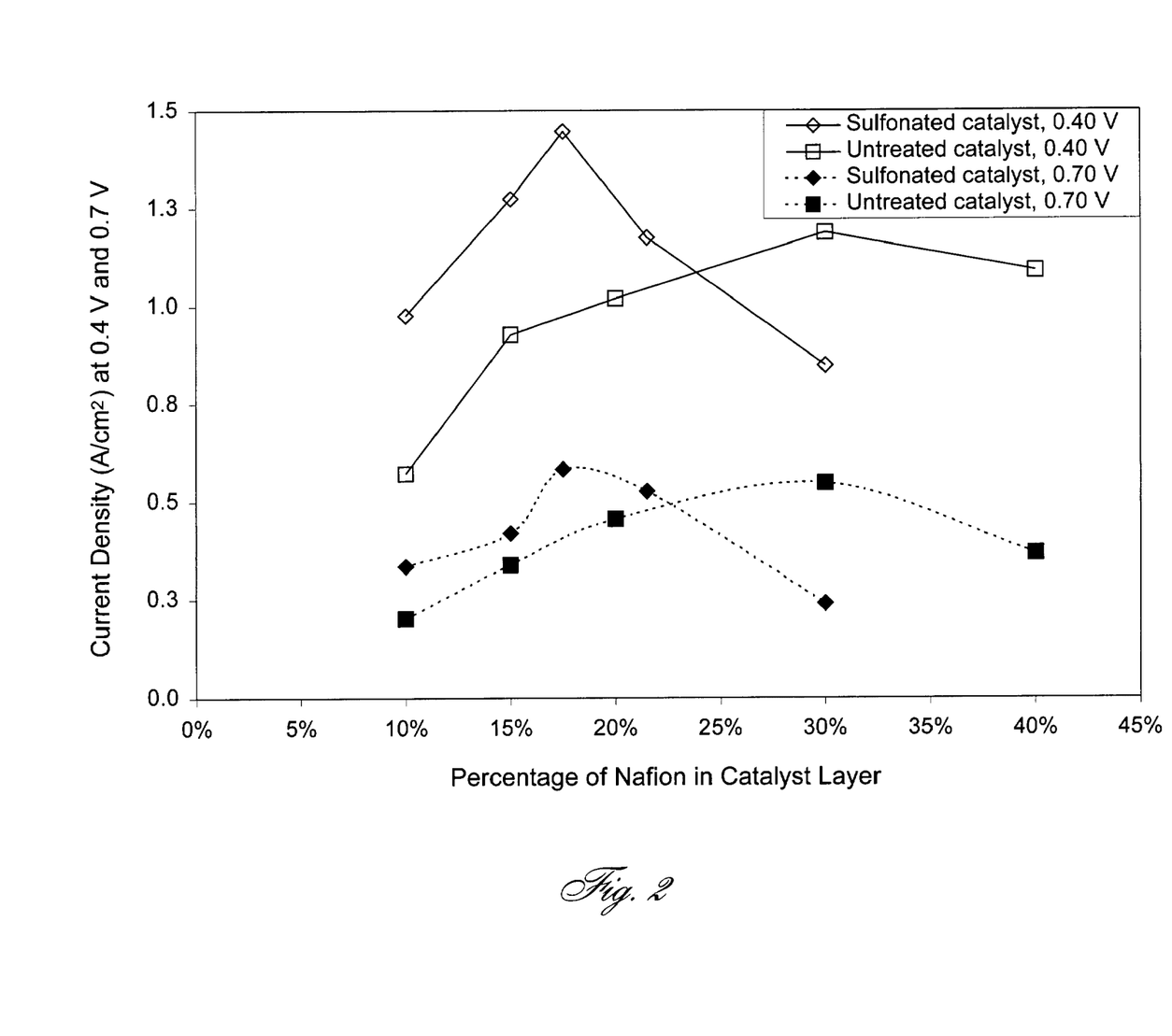
FIG. 2 depicts a graph illustrating the effect of Nafion content in the catalyst layer, upon fuel cell performance for catalysts that are either untreated or sulfonated with 10% $(NH_4)_2SO_4$.

The effect of Nafion percentage within the catalyst layers using both treated and untreated catalysts is illustrated in FIG. 2. The cell current densities at 0.40 and 0.70 V are used as examples. For the untreated catalyst, the catalyst layer containing 30% Nafion achieved the best performance. While for the catalyst treated with 10% $(NH_4)_2SO_4$, the best performance was achieved with 17.5% Nafion. The reduction of Nafion content will reduce the cost of each electrode, because Nafion is very expensive. More important is that the best performance of treated catalyst is higher than that of the untreated catalyst with the optimal Nafion contents. It is observed that the treated catalyst contained sulfonic acid group, and thus, it is not surprising that a less amount of Nafion is needed within the catalyst layer, and that higher fuel cell performance is achieved.

Figure 3:
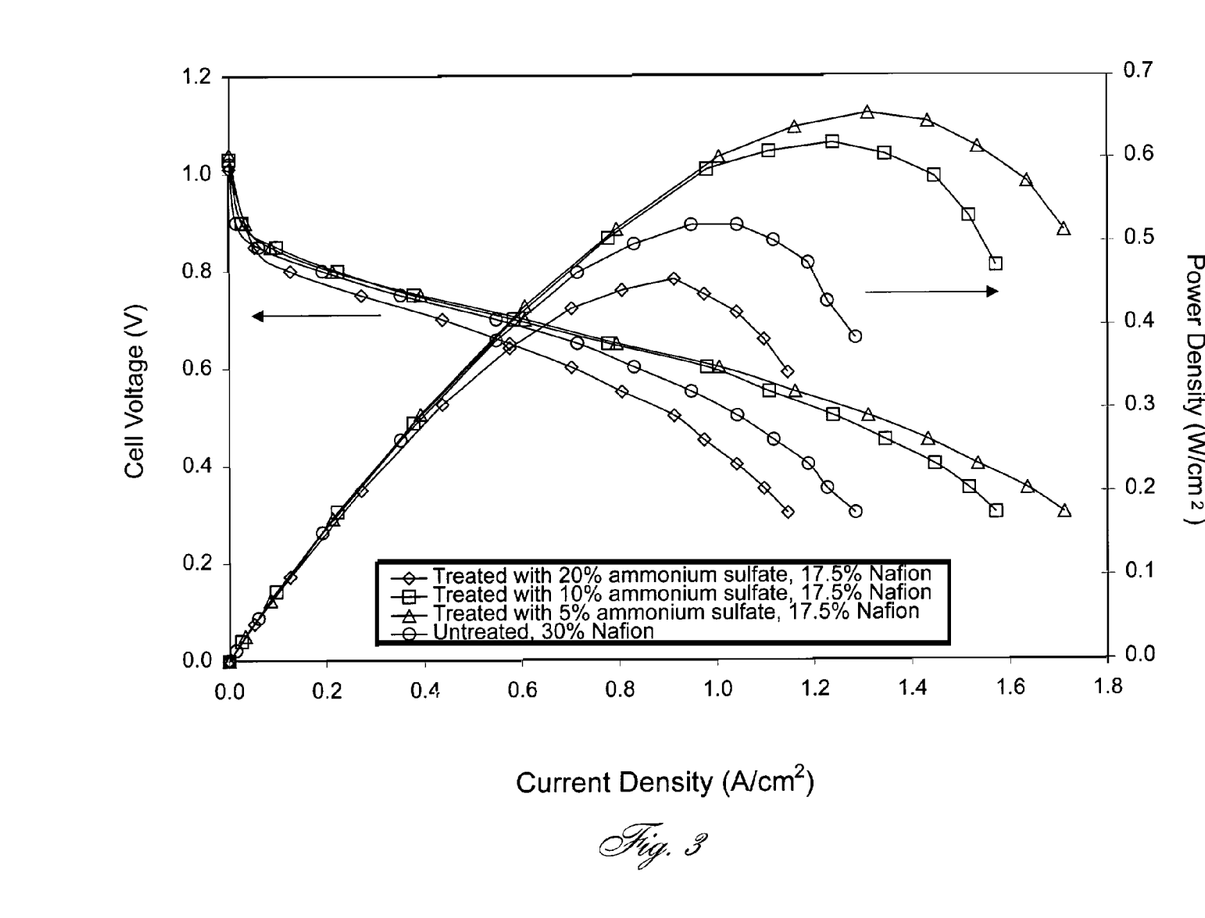
FIG. 3 illustrates a graph depicting the performance of electrodes whose catalysts have been treated with 0, 5, 10, and 20% $(NH_4)_2SO_4$.

Referring to FIG. 3, a graph of the cell voltage and power density versus current density for electrodes made using catalysts treated with 0, 5, 10, and 20% $(NH_4)_2SO_4$, respectively, is illustrated. The Pt loading of the electrodes was about 0.3 mg/cm$^2$. It can be seen that the catalysts treated with 5 and 10% $(NH_4)_2SO_4$ showed a better performance than the untreated catalyst, especially in the higher current density region. Using the treated catalyst a highest power density of 0.66 W/cm$^2$ was achieved at 0.50 V. This power density is approximately 25% higher than the number (0.52 W/cm$^2$) achieved with the untreated catalyst.

It is observed that the treatment introduces sulfonic acid onto the surface of the carbon particles resulting in a higher proton conductivity. This higher proton conductivity then enables the electrodes to sustain a higher current. Meanwhile, the electrodes made using the treated catalysts contain less Nafion than the electrodes made using untreated catalyst (17.5% versus 30%). Thus, the former would be more permeable to the reactants than the latter. This enhanced permeability will also enable the electrodes to support a higher current before the occurrence of a serious mass transport limitation. It can also be seen that the catalyst treated with 20% $(NH_4)_2SO_4$ under performs the untreated catalyst. This is probably because the former contains too much sulfonic acid on the surface of carbon, which in turn causes flooding within the catalyst layer.

Figure 4:
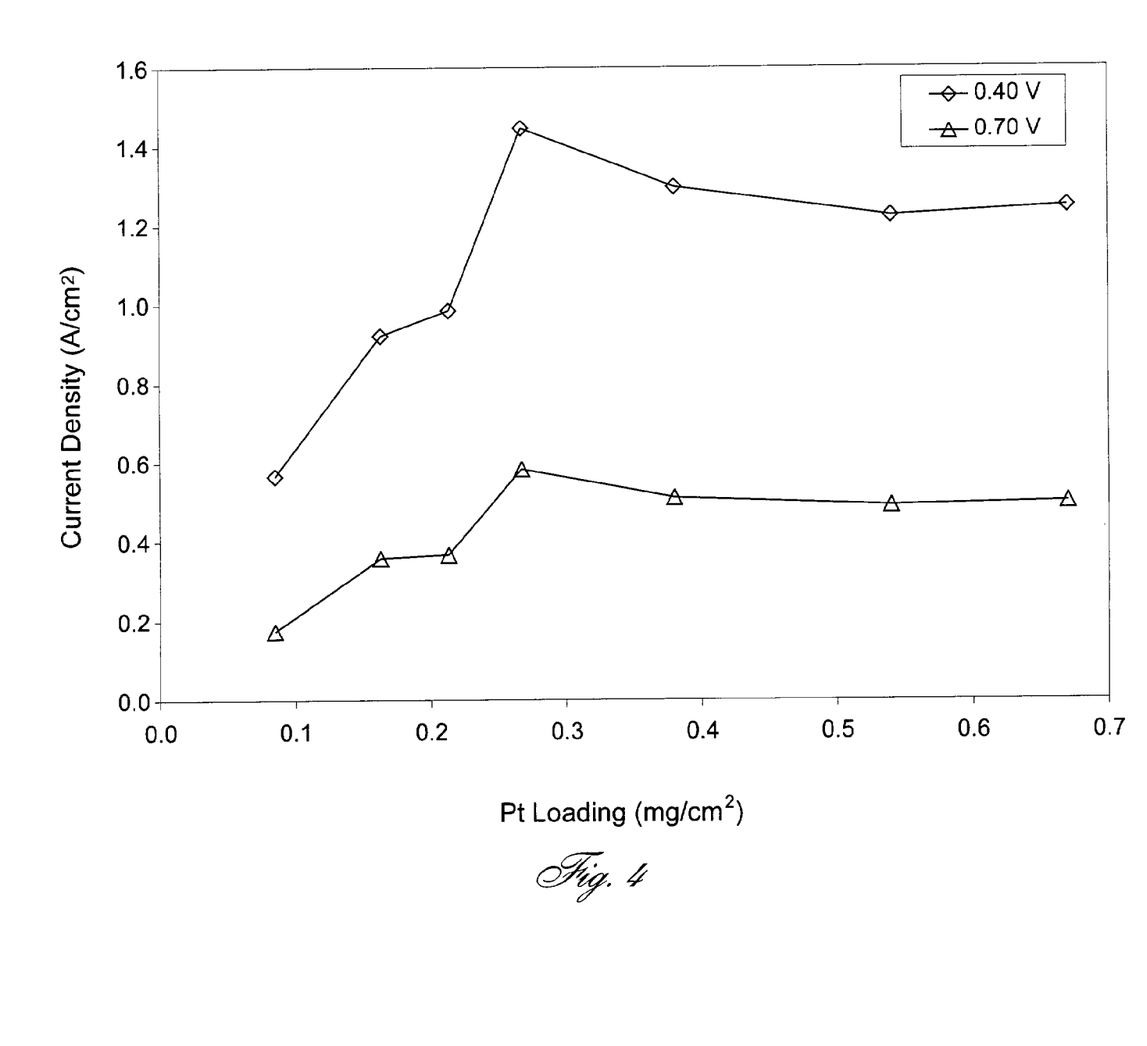
FIG. 4 shows a graph illustrating the effect of Pt loading on fuel cell performance using a catalyst sulfonated with 10% $(NH_4)_2SO_4$.

Referring to FIG. 4, a graph in which the effect of Pt loading within the catalyst layer on fuel cell performance using catalyst treated with 10% $(NH_4)_2SO_4$ is shown. The current densities at 0.40 and 0.70 V are respectively shown. The catalyst loading was changed from 0.085 to 0.67 mg/cm$^2$. Clearly, the fuel cell performance increased significantly when Pt loading was increased from 0.085 to 0.27 mg/cm$^2$. The performance declined slightly when Pt loading was further increased. The best performance was achieved at a Pt loading of approximately 0.27 mg/cm$^2$. The slight decline at higher Pt loading is probably due to the increase in catalyst layer resistance and mass transport limitation.

Figure 5:
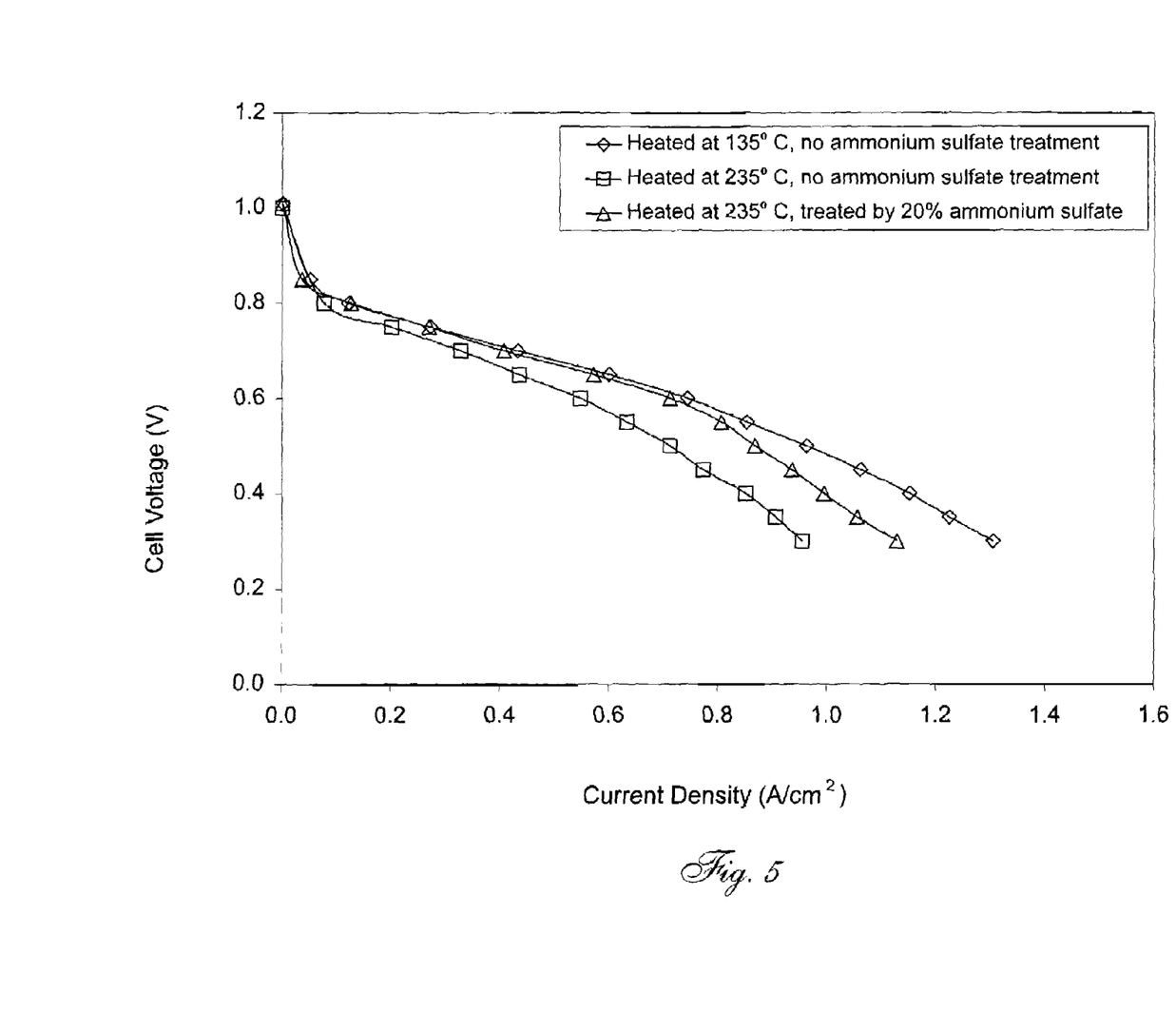
FIG. 5 depicts a graph illustrating the effect of adding $(NH_4)_2SO_4$ in a catalyst mixture on performance of a fuel cell.

The simplicity and effectiveness of treating carbon-supported catalyst using $(NH_4)_2SO_4$ was further demonstrated by the results shown in FIG. 5. During the experiment, 20% $(NH_4)_2SO_4$ was directly added into the mixture of Nafion and the catalyst. The mixture was applied to a gas diffusion medium, and the electrode was dried at 235° C. for 30 minutes. At this temperature $(NH_4)_2SO_4$ reacts with carbon to link sulfonic acid onto the surface of carbon. The electrode that did not contain $(NH_4)_2SO_4$, but was dried at 235° C. for 30 minutes, depicted a decreased performance from that of the electrode that did not contain $(NH_4)_2SO_4$ but was dried at only 135° C. Drying electrodes at 235° C. seems to adversely affect Nafion, resulting in fuel cell performance loss. However, for the electrode that contained $(NH_4)_2SO_4$ (although the Nafion within this electrode was affected at 235° C.), the performance showed only a slight decline. Obviously, the formation of sulfonic acid group on the surface of carbon from the decomposition of $(NH_4)_2SO_4$ compensates for the damage of Nafion in the drying step.

A variety of catalysts using carbon as a support was sulfonated by the method disclosed herein. The sulfonation increased the performance of all of these catalysts.

Since other modifications and changes varied to fit particular operating requirements and environments will be apparent to those skilled in the art, the invention is not considered limited to examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of forming an element comprising a reaction layer for use in an electrochemical cell, the steps comprising:
    a) providing a carbon-supported catalyst;
    b) mixing said carbon-supported catalyst with a proton conduction enhancing material;
    c) forming an element comprising a reaction layer from a mixture resulting from said mixing step (b); and
    d) after said forming step (c), directly sulfonating said element with a sulfonating agent comprising at least one of the inorganic salts from the group $(NH_4)_2SO_4$, $NH_4HSO_4$, $(NH_4)_2SO_3$, $(NH_4)_2S_2O_8$, $(NH_4)_2S_2O_3$, and $NH_4SO_3CF_3$; whereby a C—$SO_3$H linkage is formed with said carbon-supported catalyst.

2. The method of forming an element comprising a reaction layer for use in an electrochemical cell as recited in claim 1, wherein said proton conduction enhancing material comprises a perfluorinated ionomer.

3. The method of forming an element comprising a reaction layer for use in an electrochemical cell as recited in claim 1, wherein said sulfonating step (d) comprises applying said sulfonating agent to a surface of said element.

4. The method of forming an element comprising a reaction layer for use in an electrochemical cell as recited in claim 3, wherein said sulfonating step (d) comprises applying said sulfonating agent to at least one of: an electrode, and a membrane-electrode assembly (MEA).

5. The method of forming an element comprising a reaction layer for use in an electrochemical cell as recited in claim 1, the steps further comprising:
    e) heating said element at a predetermined temperature comprising a decomposition temperature of said sulfonating agents.

6. The method of forming an element comprising a reaction layer for use in an electrochemical cell as recited in claim 5, wherein sulfonating agent comprises $(NH_4)_2SO_4$ and said predetermined temperature is 235 degrees C.

7. A method of forming an element comprising a reaction layer for use in an electrochemical cell, the steps comprising:
    a) providing a carbon-supported catalyst;
    b) sulfonating said carbon-supported catalyst with a sulfonating agent comprising at least one of the inorganic salts from the group $(NH_4)_2SO_4$, $NH_4HSO_4$, $(NH_4)_2SO_3$, $(NH_4)_2S_2O_8$, $(NH_4)_2S_2O_3$, and $NH_4SO_3CF_3$;
    c) mixing said sulfonated, carbon-supported catalyst with a proton conduction enhancing material; and
    d) forming an element comprising a reaction layer from a mixture resulting from said mixing step (c).

8. A method of forming an element comprising a reaction layer for use in an electrochemical cell, the steps comprising:
    a) providing a carbon-supported catalyst;
    b) directly sulfonating said carbon-supported catalyst with $(NH_4)_2SO_4$;
    c) heating said catalyst at a temperature sufficient to decompose said $(NH_4)_2SO_4$;
    d) mixing said sulfonated, carbon-supported catalyst with a proton conduction enhancing material; and
    e) forming an element comprising a reaction layer from a mixture resulting from said mixing step (c).

* * * * *